United States Patent [19]

Wanner

[11] 4,336,848

[45] Jun. 29, 1982

[54] TOOL HOLDER FOR IMPACT DEVICE

[75] Inventor: Karl Wanner, Leinfelden, Fed. Rep. of Germany

[73] Assignee: Robert Bosch GmbH, Stuttgart, Fed. Rep. of Germany

[21] Appl. No.: 66,006

[22] Filed: Aug. 13, 1979

[30] Foreign Application Priority Data

Oct. 10, 1978 [DE] Fed. Rep. of Germany ....... 2844110

[51] Int. Cl.3 ........................ B23B 5/34; B25D 17/08; B25D 17/11

[52] U.S. Cl. .................................... 173/139; 279/19.7

[58] Field of Search ........................ 173/139, 118, 162; 279/19, 19.7

[56] References Cited

U.S. PATENT DOCUMENTS

| | | | |
|---|---|---|---|
| 1,866,335 | 7/1932 | Yungling | 173/139 X |
| 2,685,274 | 8/1954 | Liddicoat | 173/139 |
| 2,830,792 | 4/1958 | Sears | 279/19.5 |
| 2,889,811 | 6/1959 | Guillemier | 173/139 |
| 2,997,024 | 8/1961 | McLean | 173/139 |
| 3,114,421 | 12/1963 | McCloud | 173/139 X |
| 3,783,970 | 1/1974 | Danielson | 173/139 |
| 3,848,931 | 11/1974 | Swisher | 173/139 X |
| 4,018,291 | 4/1977 | Anderson | 173/139 |

FOREIGN PATENT DOCUMENTS

| | | | |
|---|---|---|---|
| 2511041 | 9/1976 | Fed. Rep. of Germany | 173/118 |
| 2303645 | 10/1976 | France | 173/139 |
| 2385495 | 12/1978 | France | 173/139 |

*Primary Examiner*—Werner H. Schroeder
*Assistant Examiner*—Andrew M. Falik
*Attorney, Agent, or Firm*—Michael J. Striker

[57] ABSTRACT

A hand-held power tool, particularly a chipping tool has an impact-damping arrangement for damping axial impacts of a striking member against a working tool. The arrangement includes a shaped member which is firmly and axially movably held on an outwardly extending portion of the tool and constituted by an elastic material. The shaped member has a substantially radial abutment face which abuts against a face of a tool holder in striking and noise-damping manner and radially overlaps an opening of a receiving recess of the tool holder so as to serve simultaneously for protection from dust.

30 Claims, 4 Drawing Figures

TOOL HOLDER FOR IMPACT DEVICE

BACKGROUND OF THE INVENTION

The present invention relates to a hand-held power tool, particularly a chipping hammer.

Known chipping hammers have a striking mechanism which includes an intermediate anvil located between a striker and a tool and taking up the energy from the striker so as to transmit this energy to the tool. The intermediate anvil supports the tool during the operation against the pressure exerted by the operator, inside the machine. An elastic ring is provided which serves as impact-damping arrangement. An annular shoulder of the intermediate anvil abuts during its reverse stroke against the elastic ring and thereby the hard material of the tool is damped (so-called B-impact damping). The tool itself, however, is in noise-transmitting connection with the tool holder which guides and holds the same so that the tool transmits vibrations to the tool holder. Dirt and dust generated during the operation can unimpededly penetrate into the insertion opening of the tool holder and travel to the peripheral seals of the intermediate anvil in the interior of the power tool, which results in premature wear of the seals. When the peripheral seals are worn out, this dirt and dust can further travel into the interior of the power tool to the striking mechanism and drive of the same. Thereby, grease-lubricated and oil-lubricated parts located inside of the power tool are considerable endangered. Premature damage and fast wear can take place. This construction has also the disadvantage that it is relatively expensive with the inner B-impact damping and intermediate anvil. The latter operates as high-loss transmission of the impact energy received from the striking mechanism which makes it necessary to provide a higher supply energy in order to obtain a required energy at the tool. Noise in the known power tool is high and it generates between the tool and the tool holder, on the one hand, and in the inner system between the striker, the intermediate anvil, and the tool, on the other hand.

SUMMARY OF THE INVENTION

Accordingly, it is an object of the present invention to provide a hand-held power tool, particularly a chipping tool which avoids the disadvantages of the prior art.

In keeping with these objects and with others which will become apparent hereinafter, one feature of the present invention resides, briefly stated, in that an outer shaped member is mounted on a shaft of a tool and constituted of an elastic material so as to support the tool and to form B-impact damping outside of the interior of the power tool.

The shaped member damps the vibrations of the tool so that they are transmitted considerably less intensively to the tool holder. Thereby noise which reflects from the tool to the tool holder is damped to a high extent. At the same time, the shaped member forms the required abutment for axial support of the tool in the power tool. The latter was attained in the known power tool by the intermediate anvil. Thereby, the shaped member forms the outwardly displaced B-impact damping. Thus, the intermediate anvil built-in in the machine can be omitted which makes the power tool considerably simpler and less expensive. This also has the advantage that improved low-loss transmission of the impact energy to the tool is attained. In addition to this, the shaped member acts as a protective member arranged on the tool holder in a shield-like manner and preventing penetration of dirt and dust to the grease-lubricated and oil-lubricated inner parts of the tool. Moreover, the inventive construction is exclusively simple and inexpensive. Since the shaped member is located outside and can be easily inspected, it is favorable to maintenance. Damage to or wear of the same may be easily detected. Therefore, the shaped member can be exchanged fast and simply.

In accordance with another feature of the present invention, the shaped member is constituted of an elastomeric material, such as rubber, rubber substitute, synthetic plastic and the like.

Still another feature of the present invention is that the shaped member has a cylindrical bush which is received in an annular section of a receiving recess of the tool holder and reciprocates together with the tool without being completely withdrawn from the annular section and so as to provide axial impact damping between the tool and the tool holder, damping of noise and protection from dust.

In accordance with a further feature of the present invention, the shaped member has an annular part which is held on the outwardly extending portion of the tool and has an annular face facing toward a front face of the tool holder and forms an abutment. This further makes the power tool simpler and cost-economical. The direct transmission of impacts to the tool from the striker without the intermediate anvil leads to the above-mentioned advantages.

The novel features which are considered as characteristics for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
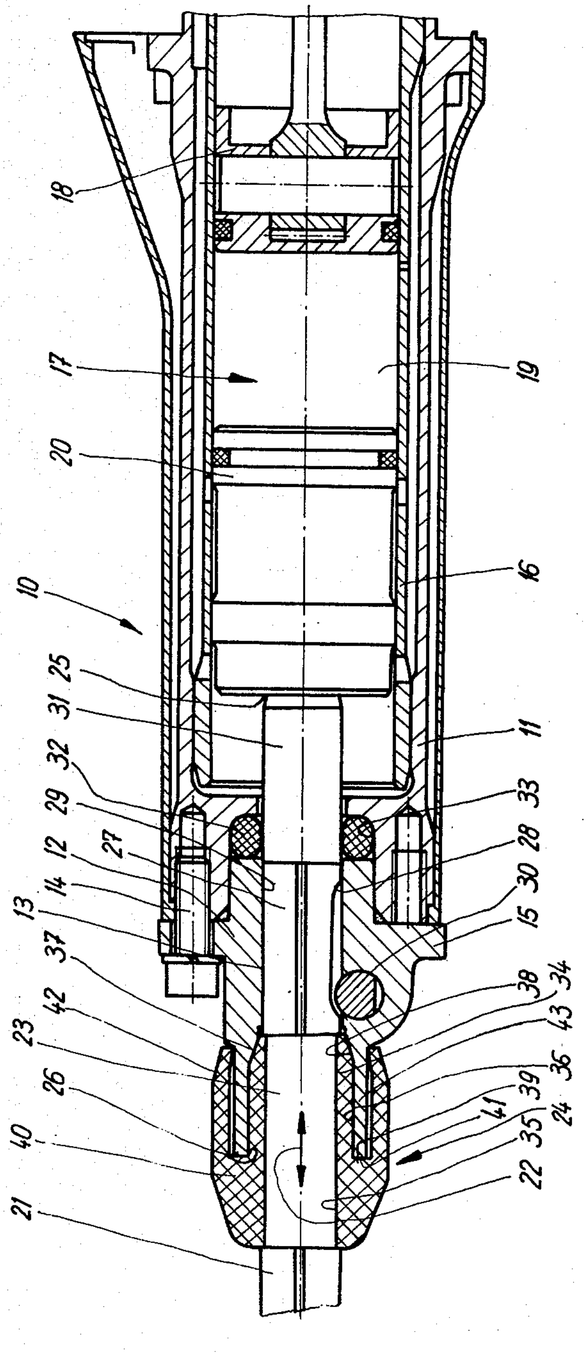
FIG. 1 is a view showing an axial longitudinal section of a chipping tool in accordance with one embodiment of the invention.

A chipping hammer shown in FIG. 1 is designated by reference numeral 10 and has a housing 11. A front tool holder 12 having a receiving recess 13 is mounted at the front end of the housing 11 by screws 14 which extend through a flange 15. The receiving recess extends coaxially with and as an extension of a cylinder 16 of the housing 11.

The chipping hammer 10 has a striking mechanism 17. It includes a reciprocating drive piston 18 whose drive is not shown in detail, and a striker 20 which is actuated from the drive piston 18 through an air cushion 19. The cylinder 16 and the striking mechanism 17 with the drive piston 18, the air cushion 19 and the striker 20 are formed in conventional manner. Their operation is known, for example, from the German Offengelungsschrift No. 2,449,191 so that further detailed description of the striking mechanism 17 is believed to be superfluous. A tool 21 formed as a chisel is inserted in the receiving recess 13 of the tool holder 12. The tool cannot rotate, but reciprocates in the direction of arrow 22. The tool 21 is form-lockingly secured in the tool holder against axial dropping out.

In the known chipping hammers, an arrangement for axial damping of impacts is provided by which during the operation of the chipping hammer the hard material of the tool is damped against the chipping hammer. This damping is so-called B-impact damping. In the known chipping hammers a so-called intermediate anvil is located between the tool 21 and the striker 20. The intermediate anvil supports the tool against the pressure applied to the operator. The intermediate anvil carries at its periphery several O-rings for sealing purposes. Dirt and dust developed during the operation can unimpededly penetrate into the receiving recess 13 of the tool holder 12. When the O-rings are worn out, the dirt and dust can further travel into the striking mechanism 17 and the drive located near the same. This is, naturally, disadvantageous since the service life of the chipping hammer is reduced and small maintenance intervals are required which involves higher maintenance expenditures. The above-mentioned arrangement for damping of impacts includes in the known chipping hammer two rubber elastic rings which are held in the interior of the housing in a recess of the latter and cooperate with an annular shoulder of the intermediate anvil. The B-impact damping in this case takes place inside of the housing. Thereby noise generated from the tool 21 and the tool holder 12 is not completely damped. The noise of impact which takes place in operation is transmitted from the tool 21 to the tool holder 12 completely without damping. The provision of the intermediate anvil leads also to generation of higher noise and to worse and high-loss transmission of the energy from the striking mechanism. Therefore, the known chipping hammer is not only expensive but is also characterized by stronger, unreasonable noise which is undamped in operation. At the same time, grease-lubricated or oil-lubricated inner parts of the hammer are not protected from dirt and dust.

In accordance with the invention, the arrangement for damping of impacts is formed as an outer shaped member 24 which is held on an outer shaft portion 23 of the tool 21 firmly, but replaceably and constituted by an elastic material. The shaped member 24 acts as a so-called B-impact damping means which is located outside of the housing 11 of the chipping hammer 10. Simultaneously, the shaped member 24 forms the required stop for axially supporting the tool 21. During the operation, the tool 21 is supported outside of the chipping hammer 10 on its tool holder 12 against the pressure applied by the operator to the chipping hammer 10. In such a construction, a free end 25 of the tool 21 can directly laterally, without the intermediate anvil, be impacted by the striker 20 of the striking mechanism 17. The intermediate anvil and the inwardly located B-impact damping means are no longer utilized. As a result of this, the costs of the chipping hammer are considerably reduced. The chipping hammer is essentially less expensive. Moreover, better and lower-loss transmission of impact energy from the striking mechanism to the tool 21 is attained. Furthermore, the shaped member 24 provides for exclusively effective damping of the vibrations of the tool 21 which are transmitted less intensively to the tool holder 12.

The shaped member 24 has at least substantially radially extending, inner and/or outer striking faces which engage the respective face of the tool holder 12 in striking manner with simultaneous damping of noise. At the same time, a front insertion opening 26 of the receiving recess 13 is overlapped by this striking face in radial direction so that simultaneous dust protection is provided. Thereby the shaped part 24 protects grease-lubricated or oil-lubricated inner parts of the chipping hammer 10 from penetration of dirt, dust or the like during the operation. This considerably increases the service life and reduces the maintenance expenses of the chipping hammer.

The shaped member 24 is constituted of an elastomeric material, for example, rubber, rubber substitute, synthetic plastic or the like elastic material. For example, such materials as PERBUNAN, VULKOLLAN and the like may be utilized.

The shaft of the tool 21 has in the region between the shaft end 25 which is directly subjected to impacts, on the one hand, and the shaft portion 23 which carries the shaped member 24, on the other hand, a polygonal section 27, for example, a hexagonal section. The Polygonal section 27 is accommodated in a polygonal bore 29, particularly a hexagonal bore, of the same shape. Thereby the shaft is held in the tool holder 12 without rotation but movably in longitudinal direction relative to the latter. An arresting pin 30 which is known in the art is held in the tool holder 12 and extends in transverse direction so as to engage in a longitudinal groove 28. Thereby the tool 21 is axially secured against dropping out and is provided with axial limit in its reciprocation in the direction of arrow 22. A cylindrical portion 31 is connected with the polygonal section 27 in alignment with the same and extends to the free shaft end 25. The cylindrical portion 31 carries a sealing ring 32. The latter is received in a recess 33 of the housing and serves as an additional sealing against losses of grease.

Construction of the shaped member 24 will now be explained in detail. The shaped member 24 has a cylindrical bush 34 which is received in a similarly shaped recess 35 such as a annular groove, of the shaft portion 23. The cylindrical bush 34 is firmly held, but is replaceable and axially immovable. The cylindrical bush 34 is thereby fully and completely fixed without a gap in the recess 35. It is inserted in a front annular space 36 of the receiving recess 13, of the same diameter. During reciprocation of the tool 21, it reciprocates without being completely withdrawn from the annular space 36. Thereby, axial impact damping between the tool 26 and the tool holder 22 is attained, and simultaneously noise damping and dust protection are provided.

The outer side of the cylindrical bush 34, which is at the right side in FIG. 1, has a decreased cross section, and the wall of the annular space 36 or the receiving recess 13 has a substantially frusto-conical shape. Thereby an inclined face 37 is formed in this region of the cylindrical bush 34 which acts as a striking face. Respectively, a frustoconical face 38 is formed inside the annular space 36, against which the cylindrical bush 34 abuts with its inclined face 37 during the operation.

The thus-constructed shaped member 24, with the provision of the cylindrical bush 34, can be sufficient for the intended purposes. In accordance with the first embodiment shown in FIG. 1, the cylindrical bush 34 is provided with a shoulder 39 which extends radially and is of one piece with the front end portion of the bush, which is opposite to the insertion end portion having the inclined face 37.

The shoulder 39 has an axial annular face 40 which abuts against a front axial end face 41 of the tool holder 12 in the region of the insertion opening 26. The shoulder 39 overlaps in the radial direction the front insertion opening 26 of the tool holder 12 so as to form, especially effective dust protection. The shaped member 24 composed of the cylindrical bush 34 with the one-piece radial shoulder 39 can sufficiently perform its intended functions.

In the embodiment shown in FIG. 1, the shaped member 24 additionally has an outer sleeve 42 which is connected with the shoulder 39 of the cylindrical bush 34 of one-piece with the same. The outer sleeve 42 extends coaxially with the cylindrical bush 34 and surrounds the latter substantially over its entire axial length at a radial distance therefrom. The outer sleeve 42 overlaps the front end portion 43 of the tool holder 12 at its outer side with clearance of motion and in a cup-shaped manner. It acts therefore as additional dust protection member which overlaps and shields the end portion 43 and simultaneously as a noise damper.

It is not shown that the shaft of the tool 21, for example over the longitudinal portion between the polygonal portion 27 and the cylindrical portion 31, may also carry an additional sleeve of elastic material which can provide additional noise damping inside the housing 11.

In order to prevent repetition, parts of further embodiments which are identical to the parts of the embodiment shown in FIG. 1 are designated by identical reference numerals.

Figure 2:
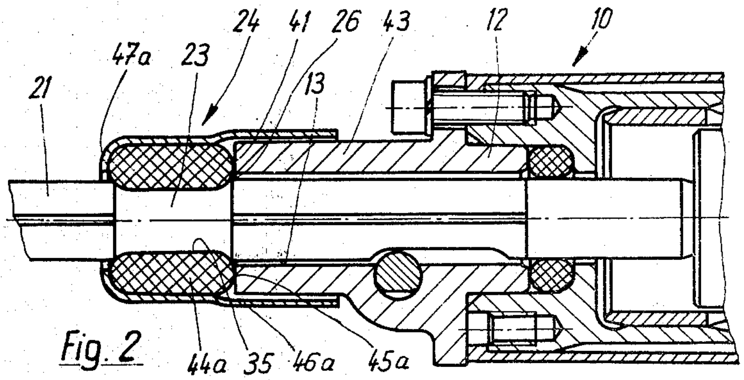
FIGS. 2–4 are views corresponding to that of FIG. 1, but showing further embodiments of the invention.
Figure 3:
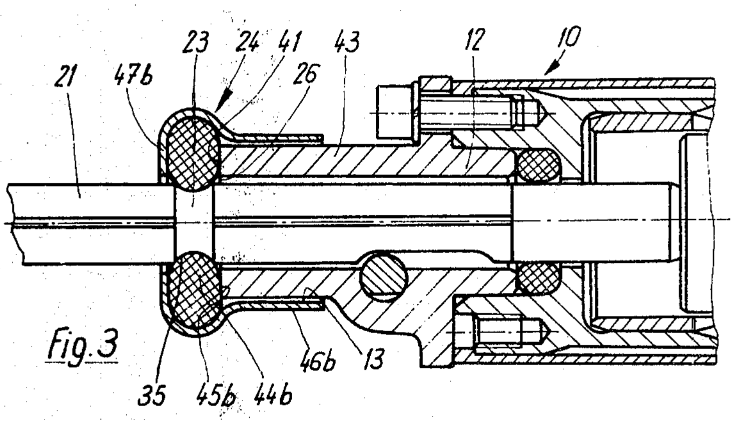
Figure 4:
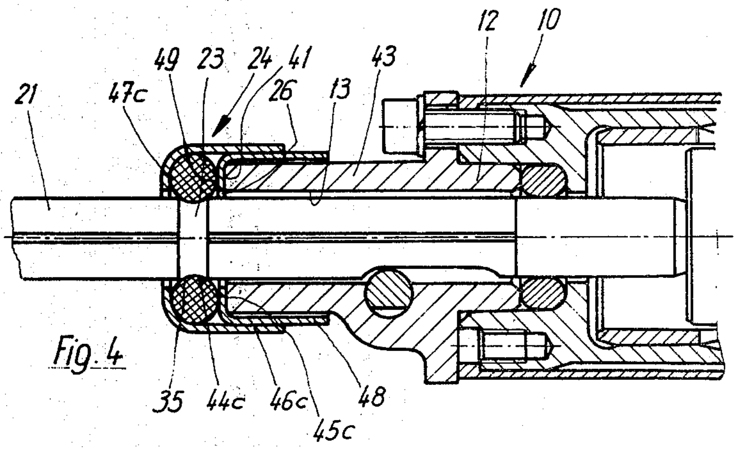

In the embodiments shown in FIGS. 2–4 the shaped member 24 has an annular part 44*a*, 44*b*, or 44*c*, which is constituted of elastic material and received in an identically shaped recess 35, particularly annular groove, of the shaft portion 23 of the tool 21. It is received firmly but replaceably and immovably in the axial direction. The annular part 44*a*, 44*b*, or 44*c* has an axial annular face 45*a*, 45*b*, or 45*c* at its side which faces toward the axial end face 41 of the front end portion 43 of the tool holder 12. The axial annular face 45*a*, 45*b*, or 45*c* extends radially outwardly of the insertion opening 26 of the receiving recess 13 and acts as a dust protection. Simultaneously, the shaped member 24 with this axial annular face 45*a*, 45*b*, or 45*c* can abut against the end face 41 of the tool holder 12 in striking and simultaneously noise damping manner. Thus, it acts as so-called B-impact damping, on the one hand, and for axially supporting the tool 21 relative to the chipping hammer 10, on the other hand.

In accordance with the second embodiment shown in FIG. 2, the annular part 44*a* has a cross section shaped as a thick cylindrical sleeve with rounded end faces. In accordance with the third embodiment shown in FIG. 3, the annular part 44*b* has a cross section shaped as a cylindrical ring which is placed at its edge and has a relatively greater radial dimension with rounded inner and outer peripheral faces. In accordance with the fourth embodiment, the annular part 44*c* has a cross section shaped as a circular ring. Further not shown cross sections lie within the limits of this invention.

In all embodiments shown in FIGS. 2–4 the annular part 44*a*, 44*b* or 44*c* has at its periphery a substantially cup-shaped jacket 46*a*, 46*b* or 46*c*, of metal or synthetic plastic material. It serves for reinforcing purposes. The jacket 46*a*, 46*b*, or 46*c* extends in the direction of insertion of the shaft of the tool 21 to the front end portion 43 and outwardly overlaps the latter over the relatively great axial length with clearance of motion and in a substantially cup-shaped manner. The axial length is so dimensioned that during the operation of the chipping hammer 10 involving movement of the tool 21 to the left, the front end portion 43 is still overlapped by the jacket 46*a*, 46*b*, 46*c*. The cup-shaped overlapping thereby always performs the functions of dust protection. In the same manner, this prevents penetration of dirt and dust during the operation of the chipping hammer 10 through the front insertion opening 26 into the receiving recess 13, and subsequently into the interior of the chipping hammer 10.

An annular bottom portion 47*a*, 47*b*, or 47*c* of the jacket 46*a*, 46*b*, or 46*c* lies at the side of the annular part 44*a*, 44*b* or 44*c*, which faces away from the axial end face 41 of the front portion 43. Thereby, each annular part 44*a*, 44*b*, or 44*c* is firmly closed and simultaneously reinforced over a relatively great outer face of the jacket. The connection between the annular part, on the one hand, and the jacket, on the other hand, is performed by glueing, welding or the like. This depends on the material of the annular part, on the one hand, and of the jacket, on the other hand.

In accordance with the fourth embodiment shown in FIG. 4 which deviates from the preceding embodiments, an inner substantially cup-shaped jacket 48 is held at the side of the annular part 44*c*, which is directed toward the end face 41 of the end portion 43. The inner jacket 48 overlaps the end portion 43 of the tool holder 12 outwardly with clearance of motion and substantially in a cup-shaped manner, and is surrounded, in its turn, by the outer jacket 46*c*. The inner jacket 48 lies with its annular bottom portion 49 on the outer face 45*c* of the annular part 44*c*. The outer jacket 46*c* and the inner jacket 48 may be either on one piece with one another, or may be formed as separate parts which are connected with one another in the region of overlapping.

It will be understood that each of the elements described above, or two or more together, may also find a useful application in other types of constructions differing from the types described above.

While the invention has been illustrated and described as embodied in a hand-held power tool, particularly, a chipping hammer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand-held power tool, particularly a chipping hammer, comprising a tool holder having an axis, and a receiving recess comprising an annular section arranged for non-rotatably and axially movably receiving a shaft of a tool and having an inlet opening, so that a portion of the tool extends outwardly beyond said tool holder in direction toward a workpiece, said tool holder having a front axial end face at one end which is opposite to the shaft receiving end, and a front axial end portion adjacent to said front axial end face; a striking mechanism arranged to transmit impact energy and to impart reciprocating movement to the tool; and an impact damping arrangement arranged for damping of axial impacts of the tool against the power tool, said arrangement including a shaped member which is constituted of a substantially elastic material and firmly and axially immovably held only on the tool without being held on another part of the power tool, so that when the tool moves axially, said shaped member is unimpededly moved axially by and together with the tool, said shaped member having a substantially radial face which abuts against a face of said tool holder in striking and noise-damping manner and radially overlaps said inlet opening of said receiving recess so as to serve simultaneously for protection from dust, said face of said tool holder being located at said tool holder side and facing in said direction toward a workpiece and being accessible for and in direct contact with said radial face of said shaped member at said side, said shaped member having a cylindrical bush which is received in said annular section of said receiving recess and reciprocates together with the tool without being completely axially withdrawn from said annular section and so as to provide axial impact damping between the tool and the tool holder, damping of noise and protection from dust, said shaped member also having an outer sleeve which surrounds said cylindrical bush at a radial distance therefrom and coaxially therewith, said outer sleeve overlapping said front axial end portion of said tool holder in a substantially cup-like manner so as to serve for protection from dust and damping noise.

2. A power tool as defined in claim 1, wherein the tool is a chisel, said receiving recess being arranged for receiving the chisel.

3. A power tool as defined in claim 1, wherein said receiving opening of said tool holder is arranged for closely embracing the tool in said tool holder.

4. A power tool as defined in claim 1, wherein said striking mechanism includes a drive piston and a striker actuated by said drive piston through an air cushion.

5. A power tool as defined in claim 4, wherein said striker of said striking mechanism is arranged to strike one end of the shaft of the tool directly without interposition of an intermediate anvil.

6. A power tool as defined in claim 1, wherein said abutment face of said shaped member is an inner face.

7. A power tool as defined in claim 1, wherein said shaped member has an outer abutment face which also abuts against a face of said tool holder in striking and noise-damping manner and radially overlaps said inlet opening of said receiving recess of said tool holder so as to serve simultaneously for protection from dust.

8. A power tool as defined in claim 1, wherein said shaped part is constituted of an elastomeric material.

9. A power tool as defined in claim 8, wherein said shaped part is constituted of rubber.

10. A power tool as defined in claim 8, wherein said shaped part is constituted of a synthetic plastic material.

11. A power tool as defined in claim 1, wherein said outer sleeve surrounds said cylindrical bush substantially over the entire axial length thereof.

12. A power tool as defined in claim 1, wherein said outer sleeve surrounds said cylindrical bush with clearance of motion.

13. A power tool as defined in claim 1, wherein the tool has a free end adapted to be impacted by said striking mechanism, and a shaft portion located between the outwardly extending portion and the free end of the tool and having a polygonal cross section, said receiving recess of said tool holder having a polygonal cross section corresponding to that of the shaft portion of the tool so that the latter is received in said tool holder non-rotatably but movably in an axial direction.

14. A hand-held power tool as defined in claim 13; and further comprising means for preventing axial dropping out of the tool from said tool holder and axially limiting reciprocation of the tool, said shaft portion having a longitudinal groove, said preventing and limiting means including an arresting pin which is held in said tool holder and extends in a direction transverse to said axis so as to engage in the longitudinal groove of the tool.

15. A power tool as defined in claim 13 wherein the tool shaft has an insertion end and a cylindrical portion forming an extension of the polygonal shaft portion of the tool; and further comprising a housing having a receiving opening, and a sealing ring carried by the cylindrical portion of the tool shaft and received in said receiving opening of said housing.

16. A power tool as defined in claim 1, wherein said cylindrical bush of said shaped part has a diameter corresponding to that of said annular section of said receiving recess.

17. A power tool as defined in claim 1, wherein said outwardly extending portion of the tool has an annular axially extending groove, said shaped member having at least a portion which is axially immovably received in said axial groove so that a wall of said groove forms the only means for axially immovably holding of said shaped member.

18. A hand-held power tool, particularly a chipping hammer, comprising a tool holder having an axis, and a receiving recess arranged for non-rotatably and axially movably receiving a shaft of a tool and having an inlet opening, so that a portion of the tool extends outwardly beyond said tool holder, said tool holder having a front face and a front end portion adjacent to said front end face; a striking mechanism arranged to transmit impact energy and to impart reciprocating movement to the tool; an impact damping arrangement arranged for damping of axial impacts of the tool against the power tool, said arrangement including a shaped member which is firmly and axially immovably holdable on said outwardly extending portion of said tool and constituted of a substantially elastic material, said shaped member having a substantially radial face which abuts against said front face of said tool holder in striking and noise-damping manner and radially overlaps said inlet opening of said receiving recess so as to serve simultaneously for protection from dust, said shaped member having an annular part which is holdable on the outwardly extending portion of the tool and having an axial annular face facing toward said front face of said tool holder and forming said abutment face; a substantially cup-shaped jacket which surrounds at least an outer face of said annular part and extends in direction of insertion so as to outwardly overlap said front end portion of said tool holder in cup-like manner; and an inner substantially cup-shaped further jacket which outwardly surrounds said front end portion of said tool holder with clearance of motion and in a cup-like manner and is in turn surrounded by said first-mentioned jacket.

19. A power tool as defined in claim 18, wherein the shaft of the tool has a portion provided with a recess formed as an annular groove, said annular part of said shaped member being received in the annular groove firmly but replaceably.

20. A power tool as defined in claim 18, wherein said annular part is formed as a circular ring.

21. A power tool as defined in claim 18, wherein said annular part is formed as a sleeve.

22. A power tool as defined in claim 18, wherein said jacket forms a reinforcement of said annular part.

23. A power tool as defined in claim 18, wherein said jacket is constituted of metal.

24. A power tool as defined in claim 18, wherein said jacket is constituted of a synthetic plastic material.

25. A power tool as defined in claim 18, wherein said annular part has a side facing away from said face of said tool holder, said jacket having an annular bottom section engaging said side of said annular part.

26. A power tool as defined in claim 18, wherein said first-mentioned jacket and said further jacket are of one-piece with one another.

27. A power tool as defined in claim 18, wherein said first-mentioned jacket and said further jacket are separate members which overlap one another and are connected with one another in the region of overlapping.

28. A hand-held power tool, particularly a chipping hammer, comprising a tool holder having an axis, and a receiving recess comprising an annular section arranged for non-rotatably and axially movably receiving a shaft of a tool and having an inlet opening, so that a portion of the tool extends outwardly beyond said tool holder in a direction toward a workpiece, said tool holder having a front axial end face at one end which is opposite to insertion end, and a front axial end portion adjacent to said front axial end face; a striking mechanism arranged to transmit impact energy and to impart reciprocating movement to the tool; and an impact damping arrangement arranged for damping of axial impacts of the tool against the power tool, said arrangement including a shaped member which is constituted of a substantially elastic material and firmly and axially immovably held only on the tool without being held on another part of the power tool, so that when the tool moves axially, said shaped member is unimpededly moved axially by and together with the tool, said shaped member having a substantially radial face which abuts against a face of said tool holder in striking and noise-damping manner and radially overlaps said inlet opening of said receiving recess so as to serve simultaneously for protection from dust, said face of said tool holder being located at said tool holder side and facing in said direction toward a workpiece and being accessible for and in direct contact with said radial face of said shaped member at said side, said shaped member having a cylindrical bush which is received in said annular section of said receiving recess and reciprocates together with the tool without being completely axially withdrawn from said annular section and so as to provide axial impact damping between the tool and the tool holder, damping of noise and protection from dust, said cylindrical bush of said shaped part having a front axial end located opposite to the insertion end and having a radially extending shoulder with an axial annular face which forms an abutment face arranged to abut against said front axial end face of said tool holder, said shaped member also having an outer sleeve which surrounds said cylindrical bush at a radial distance therefrom and coaxially therewith, said outer sleeve being of one piece with said shoulder and overlapping said front axial end portion of said tool holder in a substantially cup-like manner so as to serve for protection from dust and damping noise.

29. A power tool as defined in claim 28, wherein said shoulder is of one-piece with the remainder of said cylindrical bush.

30. A hand-held power tool, particularly a chipping hammer, comprising a tool holder having an axis, and a receiving recess arranged for non-rotatably and axially movably receiving a shaft of a tool and having an inlet opening, so that a portion of the tool extends outwardly beyond said tool holder, said receiving recess of said tool holder having an annular section; a striking mechanism arranged to transmit impact energy and to impart reciprocating movement to the tool; and an impact damping arrangement arranged for damping of axial impacts of the tool against the power tool, said arrangement including a shaped member which is firmly and axially immovably holdable on said outwardly extending portion of said tool and constituted of a substantially elastic material, said shaped member having a substantially radial face which abuts against a face of said tool holder in striking and noise-damping manner and radially overlaps said inlet opening of said receiving recess so as to serve simultaneously for protection from dust, said shaped member having a cylindrical bush which is received in said annular section of said receiving recess and reciprocates together with the tool without being completely axially withdrawn from said annular section and so as to provide axial impact damping between the tool and said tool holder, damping of noise and protection from dust, said cylindrical bush of said shaped member and said annular section of said receiving recess of said tool holder having rear end portions which are located at insertion end and substantially frustoconically reduced so as to form circumferential inclined faces over which said cylindrical bush abuts against said tool holder.

* * * * *